Oct. 25, 1966  J. E. BEROSET  3,281,692
ELECTRICAL POLARITY TEST AND VACUUM PICKUP TOOL
Filed Oct. 9, 1963
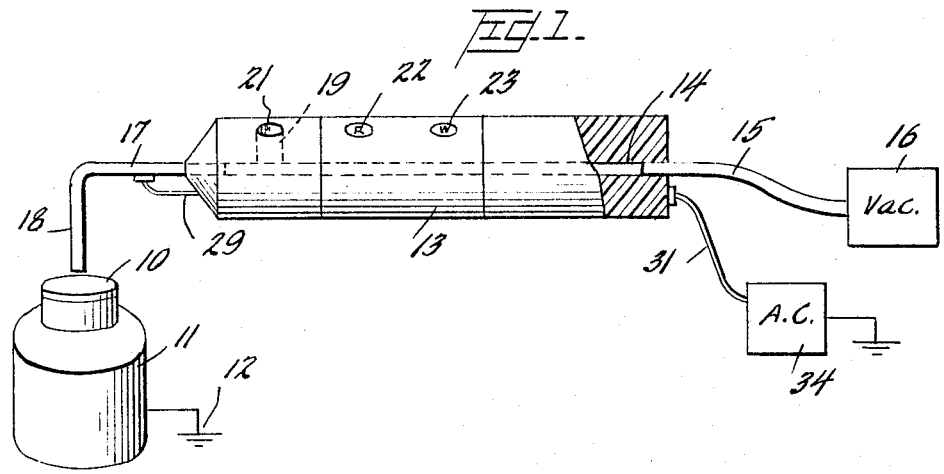
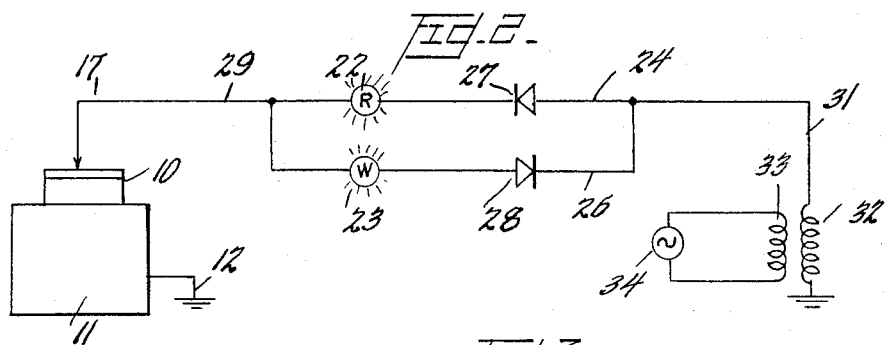
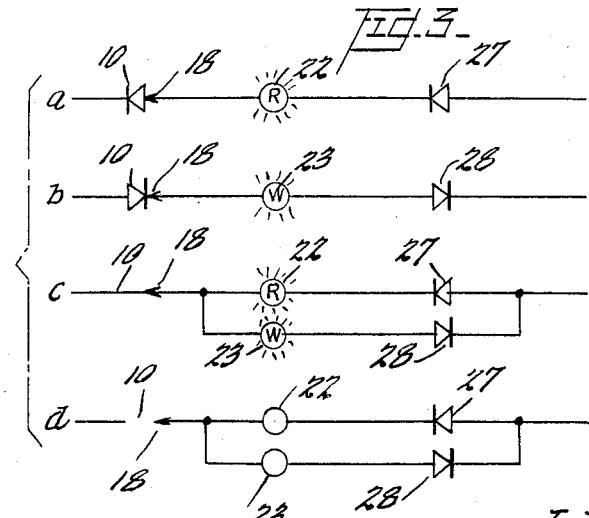
INVENTOR
*John E. Beroset,*
BY *R. P. Miller*
ATTORNEY

United States Patent Office 3,281,692
Patented Oct. 25, 1966

3,281,692
ELECTRICAL POLARITY TEST AND
VACUUM PICKUP TOOL
John E. Beroset, Fleetwood, Pa., assignor to Western
Electric Company, Incorporated, a corporation of New
York
Filed Oct. 9, 1963, Ser. No. 315,047
2 Claims. (Cl. 324—158)

This invention relates to an electrical polarity test and vacuum pickup tool and more particularly to a tool for ascertaining the polarity of a semiconductor wafer and for subsequently picking up the wafer which is of a minute size.

In the manufacture of diodes, rectifiers, and semiconductor devices, wafers, or disks of semiconductor material are used as unidirectional current conducting control elements. These semiconductor elements are of very small dimensions and hence are difficult to pick up and transport to a bonding or other fabricating location. In order to properly assemble the wafer in a diode device, the polarity must be ascertained. A further difficulty in the assembly operations resides in the fact that each wafer has a predetermined polarity which cannot be readily detected by visual inspection.

It is an object of the present invention to provide a new, simple, and inexpensive electrical test and pickup tool.

Another object of the invention resides in a simple hand tool for ascertaining the electrical characteristics of a semiconductor wafer and for subsequently picking up the wafer.

A further object of the invention is the provision of a selectively operated vacuum pickup tool having a pair of lights for visually indicating the polarity or other electrical characteristics of a small semiconductor element.

With these and other objects in view, the present invention contemplates a simple hand tool including facilities for electrically testing and picking up a semiconductor wafer. The tool comprises a tubular handle or body connected at one end to a vacuum line and connected at the other end to a projecting hollow needle. An opening or bore is provided in the handle that may be selectively closed by an operator's finger. This bore communicates with the interior of the handle to control the application of vacuum to the projecting needle to permit the selective picking up of the small semiconductor wafer.

Mounted in the tubular handle are a pair of indicating lights of contrasting colors to apprise the operator of electrical conducting or other characteristics of the wafer to be picked up. The lights are controlled by a pair of oppositely arranged unidirectionally conducting circuits which interconnect the projecting needle with a source of alternating current power. When the needle contacts a wafer, one or the other of the lights will be illuminated to apprise the operator of the polarity of the wafer. In addition, the illumination of both lights indicates to the operator the existence of a short circuit condition. If neither light is illuminated, the operator knows that an open circuit condition exists in the semiconductor wafer.

Other objects and advantages of the present invention will be apparent from the following detailed description when considered in conjunction with the accompanying drawings wherein:

FIG. 1 is a view of a test probe and pickup tool incorporating the principles of the invention;

FIG. 2 is a schematic diagram of a test circuit which is partially mounted in the tool shown in FIG. 1 and which is capable of indicating the electrical characteristics of a semiconductor wafer; and FIG. 3 illustrates four possible electrical conditions that may exist in a semiconductor wafer and the effects of such conditions on the electrical circuit.

Referring to FIG. 1, there is shown a semiconductor wafer 10 which may comprise a body of silicon or germanium positioned on an electrically conductive support 11 connected through a lead 12 to ground. The semiconductor wafer 10 may consist of two layers of silicon, one of which is N type semiconductor material and the other being P type semiconductor material. The semiconductor wafer 10 is of very minute size and it is impossible to visually inspect the body and determine the polarity.

In order to determine the polarity and pick up the wafer 10, a tool is provided which comprises a body 13 which may be grasped in an operator's hand. The body is elongated and is constructed of electrically non-conducting material such as a clear plastic sold under the trade name Lucite. A bore 14 extends through the body 13 and terminates in a connection to a flexible line 15 running to a source of vacuum 16. The opposite end of the bore 14 terminates in a connection to a needle probe 17 having a right angle tip 18 for contacting the semiconductor body 10. The needle probe is hollow thus providing a vacuum line through the needle probe, through the body 13, and through the line 15 to the vacuum source 16. A radially extending bore 19 larger in diameter than the inner diameter of the hollow needle probe, communicates with axial bore 14 and terminates in a port 21 formed in the surface of the handle body 13. When the port is uncovered as shown in FIG. 1, the vacuum is not applied to the hollow needle probe, but rather is by-passed by the larger diameter bore 19 to draw air in through the port 21.

A pair of neon lights 22 and 23 of contrasting red and white colors are mounted in the handle body 13. These lights are provided to indicate the polarity and other electrical characteristics of the semiconductor body 10. The circuit for controlling the illumination of the lights 22 and 23 is shown in FIG. 2 and includes a parallel circuit having branches 24 and 26 connected to oppositely-arranged diodes 27 and 28. One end of the parallel circuit is connected through a lead 29 to the needle probe 17. The opposite end of the parallel circuit terminates in a lead 31 running to a winding 32 inductively coupled to a winding 33 connected to a source of A.C. power 34.

In operation of the circuit, the diodes 27 and 28 are alternately conditioned for operation by the A.C. source 34. More particularly, on each positive half cycle of the A.C. power, the diode 27 is conditioned for operation whereas on each negative half cycle, the diode 28 is conditioned for operation. Neon tubes 22 and 23 are utilized so that upon operation during alternate half cycles, they will appear to the eye to be continuously illuminated.

In use of the tool an operator will uncover the port 21 and place the tip 18 in engagement with a semi-conductor 10 placed on the support 11. Inasmuch as the port 21 is uncovered, vacuum from the source 16 will be ineffective to draw the semiconductor body 10 into engagement with the tip 18. If the polarity of the body 10 corresponds to the polarity of the diode 27, then the red light 22 is illuminated (see FIG. 3a). If the polarity of the semiconductor body 10 corresponds to the polarity of the diode 28, then the white light 23 is illuminated (see FIG. 3b). In a situation where a short circuit exists through the wafer 10, current flow exists through both diodes 27 and 28 so that both the red and white lights are illuminated to apprise the operator of the short circuit conditions (see FIG. 3c). In the situation where the semiconductor body 10 is defective so that current does not flow in any direction, neither light 22 nor light 23 will be illuminated, thus apprising the operator of an open circuit condition in the wafer 10 (see FIG. 3d).

Upon completion of the electrical test, the operator may place a finger over the port 21 and the vacuum will be applied through the needle probe 17 to draw the wafer 10 into firm engagement with the end of needle tip 18. The operator now knows the polarity and the electrical acceptability of the wafer and then can properly assemble the wafer into a diode device.

It is to be understood that the above-described arrangements of circuits and construction of elemental parts are simply illustrative of an application of the principles of the invention and many other modifications may be made without departing from the invention.

What is claimed is:

1. In an electrical test and pickup tool for use in testing and picking up a semiconductor positioned on a grounded support,
   an elongated hollow tubular body,
   a conductive needle projecting from one end of the tubular body having an end section bent at right angles to engage the semiconductor positioned on the grounded support,
   said needle having a passageway extending therethrough,
   a line running from the opposite end of said tubular body to a source of vacuum for applying vacuum to the interior of said tubular body and said passageway,
   said tubular body having a hole formed therein for communicating the interior of said body with the outer surface and which is selectively covered to apply vacuum to said needle passageway to pick up a semiconductor positioned on said support,
   a pair of indicating lights of contrasting colors mounted in said tubular body,
   a circuit extending through said conductive needle and including parallel branches connected to said pair of indicating lights,
   a pair of diodes mounted in said body and connected with opposite polarity in said parallel branches, and
   a source of A.C. power connected to said circuit for selectively operating said indicating lights in accordance with the polarity of the semiconductor positioned on said support and engaged by said conductive needle.

2. In a combined electrical test probe and pickup device for electrically testing and picking up an electrically grounded semiconductor wafer having unidirectional current conducting characteristics,
   an elongated body constructed of non-conducting material and provided with an axially extending bore therethrough,
   means connected to one end of said body and communicating with said axial bore for applying a vacuum to said bore,
   an electrically conducting needle probe connected to the other end of said body and having an axial passageway extending therethrough communicating with said axial bore and adapted to contact an electrically grounded semiconductor wafer,
   said body having a radial bore extending from the axial bore to the surface of the body that is of a size that may be selectively covered by an operator's finger to control the application of vacuum to said needle passageway,
   said bore being of a substantially larger diameter than the inner diameter of the needle probe passageway so that the vacuum is by-passed through the bore rather than the passageway when said bore is uncovered,
   a pair of neon lights of contrasting colors mounted in said body,
   a parallel circuit mounted in said body and connected to said neon lights and having a pair of unidirectional current conducting devices connected to pass current in opposite directions,
   a source of alternating current connected to a first end of said parallel circuits for alternately conditioning said unidirectional current conducting devices, and
   an electrical connection between said needle probe and the other ends of said parallel circuit for cyclically operating one of said neon lights in accordance with the unidirectional current carrying characteristics of a grounded semiconductor engaged by said probe.

References Cited by the Examiner

UNITED STATES PATENTS

| | | | |
|---|---|---|---|
| 2,895,106 | 7/1959 | Taunt | 324—158 |
| 2,956,229 | 10/1960 | Henel | 324—133 |
| 3,102,750 | 9/1963 | Sandstrom | 294—64 |

WALTER L. CARLSON, *Primary Examiner.*

E. L. STOLARUN, *Assistant Examiner.*